(No Model.) 2 Sheets—Sheet 2.

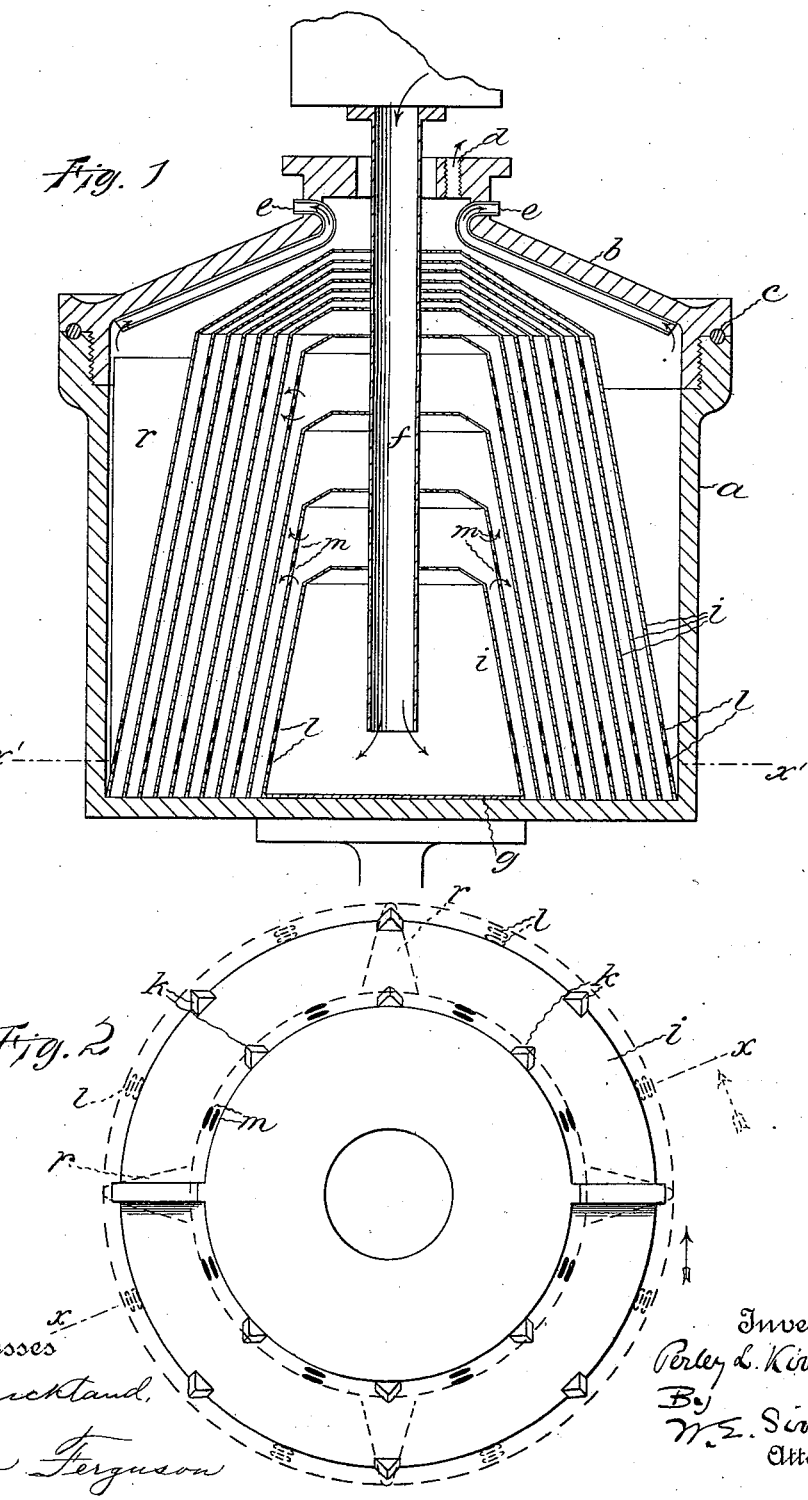

P. L. KIMBALL.
LIQUID SEPARATOR.

No. 565,280. Patented Aug. 4, 1896.

Witnesses
C. E. Buckland
Andrew Ferguson

Inventor
Perley L. Kimball
By W. E. Simonds
Attorney

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

LIQUID-SEPARATOR.

SPECIFICATION forming part of Letters Patent No. 565,280, dated August 4, 1896.

Application filed January 4, 1895. Serial No. 533,858. (No model.)

*To all whom it may concern:*

Be it known that I, PERLEY L. KIMBALL, a citizen of the United States of America, residing at Bellows Falls, in the county of Windham and State of Vermont, have invented a certain new and useful Improvement in Centrifugal Separators, of which the following is a description, reference being had to the accompanying drawings, wherein—

Figure 3:
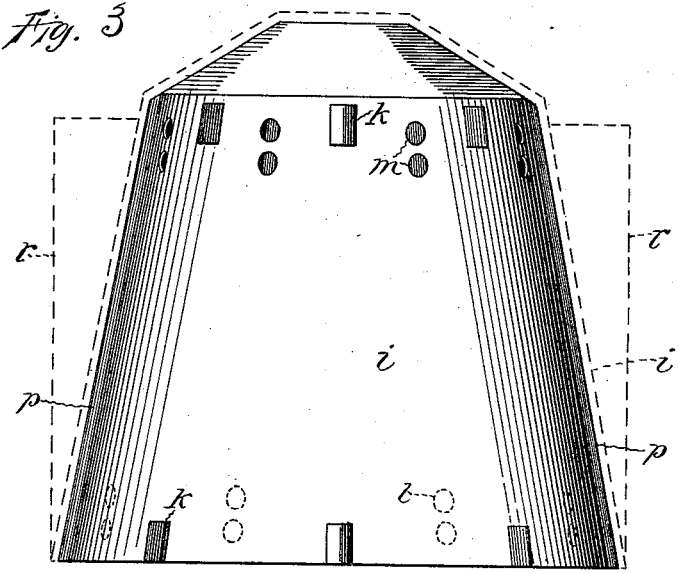
Figure 4:
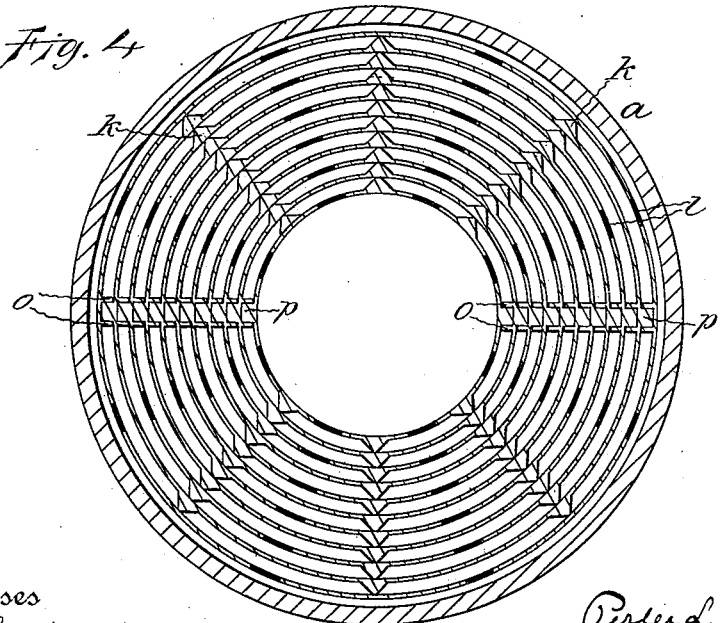

Figure 1 shows a vertical section of the device on a plane passing through the delivery-tubes and through the vertical axis of the feed-tube $f$. Fig. 2 is a plan view of the outermost conical partition, showing the wings $r$. Fig. 3 is an elevation view of the outermost partition shown in Fig. 2. Fig. 4 is a sectional view, taken on the line $x'\,x'$ of Fig. 1, of the nest of annular concentric partitions, showing the spacing projections $k$ and the rigid and grooved ways $o$ and $p$, forming stops across the annular chambers.

The apparatus shown and described herein is applicable to the separation of intermixed liquids of different densities generally, but will be herein described as applied to the separation of cream from whole milk.

The letter $a$ denotes the swiftly-rotating drum; $b$, the cover screwing upon the same; $c$, a rubber packing-ring at the joint; $d$, cream-outlet; $e$, blue-milk outlets, and $f$ feed-pipe where the whole milk enters.

The letters $i$ denote partitions which are conical, or substantially conical, in form, one within the other, and all inclined in the same general direction. The innermost of these conical partitions has a floor $g$. These conical partitions are concentric and are also separable each from the other and can all be taken out of the drum. They are kept apart by spacing projections $k$, located at numerous suitable points upon the outer surface of each of the conical partitions.

The whole milk enters through the feed-pipe $f$ and escapes therefrom near the bottom of the drum and within the smallest of the conical partitions. Here the separation of the cream from the blue milk begins immediately, the latter, under centrifugal force, tending to move radially outward and thereby forcing the cream to and toward the center. The blue milk, carrying with it more or less of the unseparated cream-globules, passes through a series of flow-passages $l$, which are at or near the bottom or lower end of the innermost conical partition, and into the annular chamber, which is between the smallest of the conical partitions and the one next contiguous. Here the blue milk, as before, tends to the outside of this annular chamber, forcing the cream radially inward, and the cream rising finds escape at the top of this annular chamber into the central space, which is filled with cream. From the annular chamber just spoken of the blue milk escapes into the next of the annular chambers through the flow-passages $m$, which are at or near the top of the conical partition next the innermost one. Here it enters another of the annular chambers and further separation of the cream from the blue milk goes on, the cream rising and escaping to join the central mass of cream and the blue milk passing into the next of the annular chambers through other flow-passages $l$ at or near the bottom of the next conical partition; and thus the process goes on in one annular chamber after another, the cream rising and moving inward to join the cream mass at the center and the blue milk passing from one annular chamber to another through the flow-passages in the conical partitions, which are located alternately at or near the opposite ends of the partitions. Finally the blue milk reaches the inner wall of the drum and escapes from the drum through the blue-milk outlets $e$, and if there be any cream separated in this final larger chamber it also rises, moves inward, and joins the central cream mass. The feed of the milk through the feed-pipe $f$ is so regulated that the quantity fed is somewhat less than can radially escape through the flow-passages $l$ of the innermost partition, to the end that all of the milk may pass through these flow-passages last mentioned. The letter $o$ denotes grooved ways on the inner surface of each of the partitions, and the letter $p$ denotes corresponding ridges on the outer surface of the partitions, sliding and coöperating with the grooved ways. Together the ridges and the grooves form dams or stops which prevent the milk in any inner annular chamber from circulating entirely around the whole of that chamber. The letters *r* denote wings on the exterior of the outermost conical partition.

I claim as my improvement—

1. In a centrifugal separator, a plurality of substantially conical partitions, one within the other, all inclined from a vertical in the same general direction, and having flow-passages for the liquid through the same near the alternately opposite ends of the partitions, all substantially as described and for the purposes set forth.

2. In a centrifugal separator, a plurality of substantially conical partitions, one within the other, all inclined from the vertical in the same general direction, having flow-passages for the liquid through the same near the alternately opposite ends of the partitions and combined with stops from one partition to another for preventing the free circular movement of the liquid relative to the partitions, all substantially as described and for the purposes set forth.

PERLEY L. KIMBALL.

Witnesses:
H. D. RYDER,
FRANK G. DAY.